United States Patent [19]
Beers

[11] 3,910,797
[45] Oct. 7, 1975

[54] ANTICORROSIVE COATING SYSTEM
[75] Inventor: Ronald W. Beers, Spring, Tex.
[73] Assignee: Exxon Research and Engineering Company, Linden, N.J.
[22] Filed: July 31, 1972
[21] Appl. No.: 276,806

Related U.S. Application Data
[63] Continuation-in-part of Ser. No. 198,457, Nov. 12, 1971, abandoned.

[52] U.S. Cl. ............... 106/1; 106/14; 106/287 SE; 260/37 SB
[51] Int. Cl. ............................................ C09d 5/10
[58] Field of Search ................ 106/14, 287 SE, 1; 260/37 SB

[56] References Cited
UNITED STATES PATENTS

| 3,634,109 | 1/1972 | Mago | 106/14 |
| 3,653,930 | 4/1972 | Low et al. | 106/287 SE |
| 3,660,119 | 5/1972 | Oken | 106/287 SE |
| 3,730,743 | 5/1973 | McLeod | 106/14 |

Primary Examiner—Allan Lieberman
Attorney, Agent, or Firm—T. B. McCulloch; D. A. Roth

[57] ABSTRACT

An anticorrosive coating system comprises a major amount of an organic silicate such as an alkyl, alkoxy, or aryl silicate and an effective amount of a ketimine. A pigment such as, but not limited to, zinc dust, and the like is added to the system for which the silicate acts as a binding agent. Optionally, the system may include a solvent such as a hydrocarbon and the like, and fillers such as, but not limited to, montmorillonite and the like.

18 Claims, No Drawings

ANTICORROSIVE COATING SYSTEM

CROSS REFERENCE TO RELATED APPLICATION

This application is a continuation-in-part of Ser. No. 198,457, filed Nov. 12, 1971, entitled "Anticorrosive System," for Ronald W. Beers now abandoned.

BACKGROUND OF THE INVENTION

1. Field of the Invention

The present invention is directed to an anticorrosive system for use as a coating. More particularly the invention is directed to a composition which is curable on exposure to atmospheric humidity leaving a tough abrasive resistant film on an exposed surface. In its more specific aspects the invention involves a pigment filled composition of an organic silicate which is applicable to corrodible surfaces or to surfaces which deteriorate by exposure to the atmosphere surrounding it and which is self curing.

2. Description of the Prior Art

It has heretofore been known to provide hydrolyzed or partially hydrolyzed organic silicates as binders for zinc dust and the like which were curable by addition of moisture from the atmosphere or by addition of water and the like. Some of these coatings required aging and/or reaction with various chemicals such as vinyl acetal, aqueous alcohol, certain amines, such as cyclohexylamine, monoethanol amine, alkyl borates, and the like. Acid catalysts such as HCL have also been used. Tetra-alkyl titanate esters have also been used to interact with low molecular weight polymers resulting from partial hydrolysis of tetra-alkyl silicates and the like.

It has not been known or obvious heretofore that the ketimines are effective catalysts in curing alkyl silicate systems on exposure thereof to moisture. It was entirely unexpected and unobvious that a ketimine would be effective in a system including an organic silicate. It was especially surprising to find that amines which were too reactive when used alone gave excellent results when incorporated as the combined ketimine. The use of a ketimine as a latent catalyst is, therefore, novel, useful and unobvious and allows obtaining of unexpected results as will appear further hereinafter.

The following references were considered in connection with this invention:

U.S. PATENT NOS.

2,524,357
3,056,684
3,375,236
3,392,036
3,392,130
3,442,824
3,457,323
3,471,588
3,653,930

BRITISH PATENT NOS.

290,717
612,622
652,136

JAPANESE PATENT NO.

22226/70

LITERATURE REFERENCES

Holm "Ketimines as Latent Curing Agents," Journal of Paint Technology, Vol. 39, No. 509, June 1967; J. Loomans and K. VanLerberghe of Application Laboratories "Tetraethyl Silicate Paints" Union Chimique Belge S.A. (May 1949).

Thus, the prior art involving use of unhydrolyzed or partially hydrolyzed alkyl silicates dates back to the mid 1940's, although a recent patent is U.S. Pat. No. 3,056,684. Most of this work was done in England and Europe by Shaw, King, Emblem and others. These products have been well established as binders in zinc rich coatings.

The methods and degree of hydrolysis have also been thoroughly investigated by the above workers. Use of alkyl silicates as binders in zinc rich paints up to now has been primarily based on the use of 70% to 95% partially hydrolyzed, acid catalyzed, polyethyl silicates. These coatings have excellent film properties and provide good anticorrosive properties when applied to steel or other metal substrates subject to corrosion. However, these coatings have two major deficiencies, (1) the shelf life of the vehicle before pigmentation with zinc dust or other colorant is limited even in sealed containers, and (2) the pot life of the mixed coating with zinc dust or other reactive pigments is limited to about six to eight hours.

In addition to these major problems, a number of other limiting problems exist such as the need to use an alkyl silicate which has been partially hydrolyzed to a high degree in order to obtain a paint film which will cure to a satisfactory hardness within a practical time (to obtain an H pencil hardness so that the coating will resist traffic and abrasion); this limits the shelf life and pot life and increases cost. Due to the acidic nature of the binder containing the acid catalyst, packaging is a problem due to corrosion of the cans.

Another disadvantage of these silicates is that, due to the nature of acid catalyzed, highly hydrolyzed alkyl silicates when pigmented and applied to surfaces in hot weather at heavy film thickness, (>4 dry mils) mud cracking of the film occurs upon curing.

Use of an amine catalyzed system such as those reported by King, Shaw et al of Silicon Developments Limited, London (1948, British Pat. No. 652,136) eliminated some of these problems. However, due to the toxicity of the amines, their high vapor pressure (volatility) and direct catalytic action on the alkyl silicates even with small amounts of moisture, problems still exist. More recently other amine catalyzed systems such as in U.S. Pat. No. 3,653,930 have been proposed.

It is the purpose of this invention to present a product which will eliminate these problems of toxicity, loss of catalyst when sprayed (due to volatility of previously used compounds such as monoethanol amine, which results in slow film cure) improved stability and ability to utilize higher catalyst concentrations when necessary due to latent catalyst evolution.

The unique and unexpected results of this invention are that high levels of ketimine catalyst retain their activity in the film. Amines tend to lose their effectiveness when added above a certain critical level (about 10–15%) as illustrated by ethanol amine, whereas the ketimine shows a continual improvement in cure rate even at a level calculated on the basis of 50% free amine by weight, resulting from hydrolysis of the ketimine by atmospheric humidity on the silicate binder.

Also an amine such as ethylene diamine per se is too reactive. Furthermore, it is unnecessary to add water to the vehicle or to the coating where a ketimine is used.

SUMMARY OF THE INVENTION

The present invention may be briefly described and summarized as a system for coating surfaces exposed to corrosion (as to the elements) in which a composition consisting essentially of water-free alkyl, aryl, or alkoxy silicates, and the like, which may be admixed with a pigment such as zinc or a clayey material, and the like and which contains a ketimine as a latent catalyst. The composition may also be provided with a solvent such as, but not limited to, mineral spirits (Varsol), or an aromatic hydrocarbon, and the like, to provide a suitable viscosity for spray or brush application. On exposure of the composition when applied to a surface such as a ferrous metal surface which is to be protected in the presence of atmospheric humidity such as that normally in the air, the ketimine causes the organic silicate to hydrolyze and the reaction products are evaporated away, leaving a surface of silicate binder, which may contain zinc dust, which protects the surface against deterioration or corrosion.

VARIABLES OF THE INVENTION

The ketimine may be produced by reaction of a ketone with primary amines or ammonia. For example, ethylene diamine, diethylene triamine, propylene diamine or hexamethylene diamine reacted with methyl isobutyl ketone may be used in the well-known reaction. The ketimine employed preferably contains no free amine groups.

Other ketones besides methyl isobutyl ketone may be employed such as, but not limited to, ketones which include acetone, methyl ethyl ketone, acetophenone and di-isobutyl ketone, and the like.

Water-free silicates besides tetraethyl silicate useful in the present invention are condensed ethyl silicate, polyethyl silicate, sometimes known as Ethyl Silicate 40, containing about 40% by weight silica being preferred, other ethyl silicates, ethylene glycol monoethyl ether silicate, tetra-2-methoxyethel silicate, tetra-n-butyl silicate, tetra isobutyl silicate, tetra isopropyl silicate and their condensed or partially polymerized counterparts. Aryl silicates such as the phenyl silicates corresponding to the alkyl and alkoxyl silicates may also be used. Mention is specifically made of phenyl ortho silicate, phenyl poly silicates, condensed phenyl silicates, and the like.

Pigments which may be used in the present invention include $TiO_2$, $Sb_2O_3$, $Fe_2O_3$, iron oxides, carbon black, aluminum powder or flakes, and zinc dust or flakes, and mixtures thereof. Extender pigments or fillers may also be used which include montmorillonite to prevent packing during storage such as that known to the trade as Bentone 27 and other clays, talcs, silicas, or similar finely ground pigments. The use of extender pigments is optional.

The vehicle may also contain a small amount of asbestos as a filler, usually about 1% to about 3% by weight. Ordinarily about 2.0% by weight of asbestos based on the vehicle may be used. Asbestos fibers confers viscosity to the vehicle.

The solvent may be a hydrocarbon, such as mineral spirits (Varsol), xylene, and the like. Preferably, the solvent may be paraffinic hydrocarbons boiling in the range from about 280°F. to about 350°F. Glycol ethers, ethyl alcohol, isopropyl alcohol, butyl alcohol, and other low boiling alcohols and the like may also be used. Mixtures of mineral spirits, ethanol, ethylene glycol monoethyl ether may also be used as the solvent in various ratios of about 1:1:1 but other ratios may be used.

The amounts of the various components of the pigmented composition may range as follows:

|                        | Parts by Weight |    |    |       |    |                          |
|------------------------|-----------------|----|----|-------|----|--------------------------|
| Organic silicate       | about           | 10 | to | about | 90 | (Preferably about 30–60) |
| Ketimine               | "               | 2  | "  | "     | 50 | (Preferably about 5–50)  |
| Solvent                | "               | 10 | "  | "     | 40 |                          |
| Pigment                | "               | 20 | "  | "     | 93 |                          |
| Other fillers, such as | "               | 0  | "  | "     | 15 |                          | asbestos and other extender fillers

The important components are the silicate, the ketimine and, of course, the pigment for protection against corrosion. The solvent and fillers are also useful in providing viscosity control and minimizing pigment setting.

DESCRIPTION OF THE PREFERRED MODES AND/OR EMBODIMENTS

In order to illustrate the invention further, a number of compositions were made up comparing the present invention using ketimines versus hydrochloric acid and ethanol amine as catalysts. These data are shown in the following table:

TABLE I

Comparison of Various Ketimines and Ethanol Amine vs. Hydrochloric Acid as Catalyst for Unhydrolyzed and Partially Hydrolyzed Alkyl Silicates

|        |                                                          | A    | B    | C    | D    | E     |
|--------|----------------------------------------------------------|------|------|------|------|-------|
| Part A | Binder H6[1]                                             |      |      |      |      | 114.0 |
|        | TEOS (tetraethyl ortho silicate)*                        | 37.0 | 37.0 | 37.0 | 37.0 |       |
|        | S–40 Polyethyl silicate (40% silica)*                    | 77.0 | 77.0 | 77.0 | 77.0 |       |
|        | Ethanol Amine                                            |      |      |      | 17.0 |       |
|        | K–1[2]                                                   | 28.5 |      |      |      |       |
|        | K–2                                                      |      | 28.5 |      |      |       |
|        | K–3                                                      |      |      | 55.0 |      |       |
|        | Mineral Spirits/ethanol/ethylene glycol monoethyl ether 1/1/1 | 25.0 | 25.0 | 25.0 | 36.5 | 36.5 |

TABLE I-continued

Comparison of Various Ketimines and Ethanol Amine vs. Hydrochloric Acid as Catalyst for Unhydrolyzed and Partially Hydrolyzed Alkyl Silicates

|  |  | A | B | C | D | E |
|---|---|---|---|---|---|---|
| PART B | Bentone (Montmorillonite) | 5.0 | 5.0 | 5.0 | 5.0 | 5.0 |
|  | Zn Dust | 450.0 | 450.0 | 450.0 | 450.0 | 450.0 |
|  |  | 622.50 | 622.50 | 649.00 | 622.50 | 605.50 |

(1) Hydrochloric acid catalyzed, 80–90% hydrolyzed ethyl silicate.
(2) K-1 Reaction product of diethylene triamine and methyl isobutyl ketone. (no free amine groups)
  K-2 Reaction product of ethylene diamine and methyl isobutyl ketone. (no free amine groups)
  K-3 Reaction product of diethylene triamine, a monoglycidal ether and methyl isobutyl ketone. (no free amine groups)
*Non-hydrolyzed These compositions were then subjected to the well known tests for zinc and the like coatings compositions after exposure to the atmosphere as a coating with the results shown in the following table:

TABLE II

Typical Data of Systems Shown in Table I

| | | A | B | C | D | E |
|---|---|---|---|---|---|---|
| Shelf Life (vehicle only Part A) | | 1 yr. | 1 yr. | 1 yr. | 1 yr. | 6 mos. |
| Pot Life | — days (mixed coating) | 10 | 10 | 10 | 10 | 8 hrs. |
| Cure Rate | — 16 hrs. 60% relative humidity, 77°F | F–H | H–2H | 3B–2B | B | H |
| | — 24 hrs. 75% relative humidity, 40°F | — | F–H | — | 3B–2B | F |
| Taber Abrasion | — mg loss/1000 cycles | 500 | 586 | 950 | 795 | 750 |
| Film Build Properties | — mils DFT* before mud cracking | 8–10 | 8–10 | 8–10 | 7 | 3–4 |
| Flash Point TOC | — °F | 90° | 90° | 90° | 90° | 65° |

*DFT = dry film thickness
TOC = Tag. Open Cup

It will be clear from these results that the ketimine cured coatings are vastly superior to those of the prior art, it being remembered that the ketimine containing coating was cured by exposure to atmospheric humidity, the pot life and shelf life being superior to the acid catalyzed partially hydrolyzed silicate. Also, the ketimine cured compositions were superior in film build properties in that no mud cracking of the film occurred even at 10 mils dry film thickness. This is most unusual for ethyl silicate zinc rich coatings.

The ketimine cured coating renders protection with a thinner coating as shown by the following data:

TABLE III

Salt Fog Exposures - 5% Salt Fog and 100% Humidity

| System from Table II | Dry Film Thickness mils | 5% Salt Fog 1000 hrs. | 100% Fresh Water Humidity 1000 hrs. |
|---|---|---|---|
| B (Ketimine) | 2.00 | No rusting | No rusting |
| D (Ethanolamine) | 2.50 | No rusting | No rusting |
| E (Acid Catalyzed) | 2.25 | No rusting | No rusting |

The concentration of ketimine is important in improving the film hardness as shown by the data in Table IV which follows:

TABLE IV

Effect of Concentration of Ketimine on Film Cure Rate of Polyethyl Silicate, 20% Hydrolyzed

| | A | | | B | | | C | | | | D | | |
|---|---|---|---|---|---|---|---|---|---|---|---|---|---|
| Catalyst | Mono-Ethanol Amine | | | K1 | K1 | K1(1) | K2 | K2 | K2 | K2(2) | K3 | K3 | K3(3) |
| % Free Polyamine(4) | 5 | 10 | 20 | 5 | 10 | 20 | 5 | 10 | 20 | 50 | 5 | 10 | 20 |
| Pencil Hardness | | | | | | | | | | | | | |
| 2 hrs. | 5B | HB | 2B | 5B | 4B | 3B | 5B | 4B | 4B | | 6B | 5B | |
| 12 hrs. | 2B | F | HB | 2B | 2H | B | B | 2H | 2H | | 5B | 2B | |
| 24 hrs. | F–H | H–2H | F | F–H | 4H | F–H | H–2H | 5H | 6H | | 2B | HB–F | |

NOTES:
(1) K-1 Reaction product of diethylene triamine and methyl isobutyl ketone.
(2) K-2 Reaction product of ethylene diamine and methyl isobutyl ketone.
(3) K-3 Reaction product of diethylene triamine monoglycidal ether and methyl isobutyl ketone.
(4) Percent free amine is based on the weight of polyalkyl silicate. The amine content of the ketimine is based on the assumption that complete hydrolysis occurs on atmospheric humidity exposure yielding 27% amine by weight.

The ketimine catalyzed ethyl silicate is superior to amine catalyzed ethyl silicate in the areas of cure rate (pencil hardness measurements), abrasion resistance (Taber abrasion tests) performance at 40° F. and 75% relative humidity and ability to scavenge humidity from the atmosphere. The ketimine acts as a dormant catalyst which is activated when humidity is introduced into the system. This happens when the coating is sprayed onto a surface and humidity is absorbed from the air and thus an in situ catalyst effect is achieved.

A further advantage is achieved over an amine catalyzed ethyl silicate coating because there is less loss of catalyst during spraying because the molecular weight of the ketimine is higher and hence the vapor pressure and volatility of the ketimine is lower than that of the ethanol amine. Therefore, there is more catalyst present in the ketimine based film to catalyze the polymerization of the ethyl silicate than in a similar type film containing ethanol amine.

To illustrate further the present invention, with respect to the polymerization or cure rate, reference is made to Table V where a comparison is given between polyethyl silicate 40 (about 40% $SiO_2$) and tetraethyl ortho silicate.

TABLE V

EFFECT OF DEGREE OF POLYMERIZATION ON CURE RATE

|  | A | B |
|---|---|---|
| Polyethyl Silicate 40 | 84 | — |
| Tetraethyl orthosilicate | — | 84 |
| Ketimine-pure | 10 | 10 |
| Mineral Spirits (Varsol) | 30 | 30 |
| Zinc Dust (8–10 micron) | 400 | 400 |
|  | 524 | 524 |

Cure rate at 76°F; 68% Relative Atmospheric Humidity

|  | A | B |
|---|---|---|
| Dry Film Thickness - mils | 2.0 | 2.0 |
| Pencil Hardness |  |  |
| 1 hr. | 5B–4B | 5B–4B |
| 2 hrs. | 3B–2B | 3B–2B |
| 4 hrs. | HB–F | 2B–B |
| 6 hrs. | F–H | 2B–B |
| 8 hrs. | H–2H | B–HB |
| 24 hrs. | 3H–4H | F–H |

It will be clear that the polyethyl silicate 40 is superior to tetraethyl ortho silicate although both were non-hydrolyzed as applied as a coating with zinc and were cured by exposure to atmospheric humidity only.

The polyethyl silicate of Table V was then compounded with other materials and tested for salt fog exposure (the inverted V panel test-24 hours salt fog) cure rate, and water insensitivity (3 mil dry film) by water immersion and compared to a commercial water based alkali silicate vehicle as shown in Table VI.

TABLE VI

|  | Polyethyl silicate A |
|---|---|
| Xylene | 148.0 |
| Butanol (anhydrous) | 10.0 |
| Extenders | 17.0 |
| Polyethyl silicate (Ethyl-silicate 40) (40% $SiO_2$) | 157.5 |
| Ketimine-pure | 48.7 |
|  | 381.2 |

|  | 1 | 2 |
|---|---|---|
| A(above) Polyethyl silicate vehicle | 57.50 | — |
| Water based alkali silicate vehicle | — | 65.00 |
| Zinc Dust - 8–10 micron | 150.00 | 210.00 |
|  | 207.50 | 275.00 |

|  | 1 | 2 |
|---|---|---|
| Salt Fog Exposure - 1000 hrs[1] ASTM method | 10[2] | 10 |
| Inverted "V" panel test 24 hrs. salt fog | 10 | 6 |
| Cure rate-Pencil hardness 5 hrs. 75°F; 50% relative humidty | 3H | 3H |
| Water insensitivity-3 mil. dry film (by water immersion) | 20 min. | 4 weeks |

[1]Steel panels coated to a film thickness of 3 mils of dry coating and scribed with an "X" to bare steel.
[2]10 = perfect 1 = very poor.

The inverted V panel test is conducted on a 4 inch × 6 inch steel panel clean to white metal, coated with the coating and masked with tape to leave base an inverted V and then cured for 24 hours and exposed to salt fog for 24 hours. It is to be noted that the present invention is superior to the prior art. Particularly noteworthy is the water insensitivity of the present invention after only 20 minutes.

A typical composition in accordance with the present invention may be as shown in Table VII:

TABLE VII

|  | % by wt. |
|---|---|
| Xylene | 26.2 |
| Butanol | 2.6 |
| Asbestos fiber | 1.8 |
| Silica | 2.6 |
| Ethyl Silicate 40 | 41.4 |
| Aromatic Hydrocarbon* ($C_n$ and higher) | 12.6 |
| Ketimine | 12.8 |
|  | 100.0 |

*About 300–350°F. boiling range.

This composition is eminently suitable as a vehicle to which zinc dust may be added. For example, the vehicle of Table VII may be about 0.75 gallons and the zinc dust about 0.25 gallons.

The composition of the present invention is applicable to structural members such as steel, other ferrous metal surfaces, and the like, and the vehicle may be utilized to stabilize earth works such as dams, levees, and the like. It may also be useful to stabilize land that is subject to permafrost thawing provided the water content is not too high.

The composition may be applied to spray gun, paint brush, rollers, or other dispersion means.

The nature and objects of the present invention having been completely described and illustrated and the best modes and embodiments contemplated set forth, what I wish to claim as new and useful and secure by letters patent is:

1. A coating composition which comprises:
   1. 10 to 90 parts by weight of a water-free organic silicate selected from the alkyl, aryl, and alkoxy silicates; and
   2. 2 to 50 parts by weight of a ketimine sufficient to cure said organic silicate on exposure to water.

2. A composition in accordance with claim 1 containing a sufficient amount of solvent to provide a sprayable vehicle.

3. A composition in accordance with claim 1 containing a sufficient amount of a solid pigment to form an abrasion resistant film.

4. A composition which consists essentially of about 10 to about 90 parts by weight of polyethyl silicate, about 2 to about 50 parts by weight of ketimine, about 10 to about 40 parts by weight of a solvent, about 20 to 93 parts by weight of a pigment, and from 0 to about 15 parts by weight of filler.

5. A composition in accordance with claim 4 in which the polyethyl silicate is about 30 to about 60 parts by weight and the ketimine is about 5 to about 50 parts by weight, and in which the solvent comprises mineral spirits, and the pigment is zinc dust or powder.

6. A composition in accordance with claim 4 in which the ketimine is the reaction product of ethylene diamine and methyl isobutyl ketone.

7. A composition in accordance with claim 1 wherein said composition comprises:
   10 to 90 parts by weight of said organic silicate,
   2 to 50 parts by weight of said ketimine,
   10 to 40 parts by weight of a solvent, and
   20 to 93 parts by weight of a pigment.

8. A composition in accordance with claim 7 in which the pigment is selected from the group consisting of zinc dust or powder, titanium dioxide, aluminmum powder or flakes, $Fe_2O_3$ powder and $Sb_2O_3$ powder.

9. A composition in accordance with claim 7 in which said silicate is tetraethyl orthosilicate and a small but efffective amount of a montmorillonite is present as a filler to aid in film build and reduce pigment settling.

10. A composition in accordance with claim 7 in which the silicate is a mixture of tetra ethyl orthosilicate and polyethylsilicate.

11. A composition in accordance with claim 7 in which the silicate is an ethyl silicate.

12. A composition in accordance with claim 7 in which the silicate is tetra ethyl silicate.

13. A composition in accordance with claim 7 in which the organic silicate is 30 to 60 parts by weight of the composition and the ketimine is 5 to 50 parts by weight of the composition.

14. A composition in accordance with claim 7 which contains a small but effective amount of asbestos fiber.

15. A coating composition vehicle curable by exposure to atmospheric vapor which consists essentially of:
   10 to 90 parts by weight of polyethyl silicate,
   2 to 5 parts by weight of a ketimine,
   10 to 40 parts by weight of a solvent, and
   0 to 15 parts by weight of a filler.

16. A composition in accordance with claim 15 in which said solvent comprises xylene, butanol and hydrocarbon boiling in the range from about 300° to about 350°F.

17. A composition in accordance with claim 16 which contains a small but effective amount of the filler and the filler comprises asbestos fiber and silica.

18. A composition in accordance with claim 17 together with zinc dust or powder.

* * * * *